United States Patent
Suzuki (10) Patent No.: US 11,669,430 B2
(45) Date of Patent: Jun. 6, 2023

(54) PERFORMANCE INFORMATION VISUALIZATION APPARATUS, PERFORMANCE INFORMATION VISUALIZATION METHOD, AND NON-TRANSITORY COMPUTER-READABLE STORAGE MEDIUM

(71) Applicant: FUJITSU LIMITED, Kawasaki (JP)

(72) Inventor: Kazuhiro Suzuki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 5 days.

(21) Appl. No.: 17/464,735

(22) Filed: Sep. 2, 2021

(65) Prior Publication Data

US 2022/0121547 A1 Apr. 21, 2022

(30) Foreign Application Priority Data

Oct. 21, 2020 (JP) .............................. JP2020-176461

(51) Int. Cl.
*G06F 11/00* (2006.01)
*G06F 11/34* (2006.01)
(Continued)

(52) U.S. Cl.
CPC ...... *G06F 11/3409* (2013.01); *G06F 11/3006* (2013.01); *G06F 11/3075* (2013.01); *G06F 11/327* (2013.01); *G06F 11/3466* (2013.01)

(58) Field of Classification Search
CPC .............. G06F 11/3409; G06F 11/3006; G06F 11/3075; G06F 11/327; G06F 11/3466
See application file for complete search history.

(56) References Cited

U.S. PATENT DOCUMENTS

| 2006/0056318 A1* | 3/2006 | Jung ...................... H04L 12/66 370/256 |
| 2007/0171716 A1* | 7/2007 | Wright .................. G06T 11/206 365/185.12 |

(Continued)

FOREIGN PATENT DOCUMENTS

| EP | 3240232 A1 | 11/2017 |
| JP | H09-289508 A | 11/1997 |
| WO | 2017/154063 A1 | 9/2017 |

OTHER PUBLICATIONS

Extended European Search Report dated Feb. 21, 2022 for corresponding European Patent Application No. 21194677.7, 10 pages.
\*\*\*Please note US-2018/0196689-A1 cited herewith, was previously cited in an IDS filed on Sep. 2, 2021.\*\*\*

*Primary Examiner* — Charles Ehne
(74) *Attorney, Agent, or Firm* — Fujitsu Patent Center (57) ABSTRACT

A performance information visualization apparatus includes a memory and a processor. The memory configured to stores, as node information, information that indicates a connection relationship of a node, and information that indicates a generation in which the node is added to an information processing system and a generation in which the node is deleted from the information processing system. The processor configured to that synthesizes configuration information by, when an event occurrence node where an event has occurred does not exist in configuration information of a specific generation associated with a time when the event has occurred and the event occurrence node is added to the configuration information, adding a node and connection between nodes including a connection relationship of the event occurrence node, based on the node information.

5 Claims, 10 Drawing Sheets

(51) Int. Cl.
  *G06F 11/30*     (2006.01)
  *G06F 11/32*     (2006.01)

(56) References Cited

U.S. PATENT DOCUMENTS

2010/0189014 A1* 7/2010 Hogan ................ H04L 63/0435
                                                                370/255
2013/0007262 A1   1/2013 Akatoki et al.
2018/0196689 A1   7/2018 Suda et al.

* cited by examiner

| NODE NAME | INPUT NODE NAME | OUTPUT NODE NAME | ADDITION GENERATION | DELETION GENERATION |
|---|---|---|---|---|
| vol03 | VM03 | St003 | T3 | T5 |
| VM03 | tenantA | vol3, Server002 | T3 | T5 |
| St003 | vol03 | psw001 | T3 | T5 |
| tenantA | None | VM1, VM2 | T1 | T3 |
| tenantA | None | VM1, VM2, VM3 | T3 | T5 |
| tenantA | None | VM1, VM2 | T5 | - |
| psw001 | St001, St002 | None | T1 | T3 |
| psw001 | St001, St002, St003 | None | T3 | T5 |
| psw001 | St001, St002 | None | T5 | - |
| Server002 | VM02 | psw002 | T1 | T3 |
| Server002 | VM01, VM02 | psw002 | T3 | T5 |
| Server002 | VM02 | psw002 | T5 | - |

PERFORMANCE INFORMATION VISUALIZATION APPARATUS, PERFORMANCE INFORMATION VISUALIZATION METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2020-176461, filed on Oct. 21, 2020, the entire contents of which are incorporated herein by reference.

FIELD

The embodiment discussed herein is related to a performance information visualization apparatus, a performance information visualization method, and a non-transitory computer-readable storage medium.

BACKGROUND

In a cloud environment where a customer system operates, it is useful to display configuration information and performance information together at a fault investigation. Here, the configuration information is information indicating a configuration of the cloud environment, and is information indicating a connection relationship of a node included in the cloud environment. The node include a service, a virtual resource, and a physical resource, for example. The virtual resource include a virtual machine (VM), a virtual volume, a virtual storage, and a virtual network device, for example. The physical resource include a physical machine, a physical volume, a physical storage, and a physical network device, for example. All the nodes included in the cloud environment or only nodes used by the customer system among the nodes included in the cloud environment are displayed as the configuration information.

The connection relationship include, for example, a deployment relationship between the service and the virtual machine (VM) or container, a deployment relationship between the VM or container and the physical machine, and a deployment relationship between the virtual volume and the physical volume. Furthermore, the connection relationship include, for example, a usage relationship between the VM or container and the virtual volume, a usage relationship between the physical machine and the physical volume, a usage relationship between the physical machine and the physical network device, and a usage relationship between the virtual machine and the virtual network device.

The performance information is information indicating performance of the node. The performance information include usage rates of the virtual machine, the physical machine, the virtual volume, and the physical volume, data transfer rates of the virtual volume and the physical volume, and data transfer rates of the virtual network device and the physical network device, for example.

Figure 8:
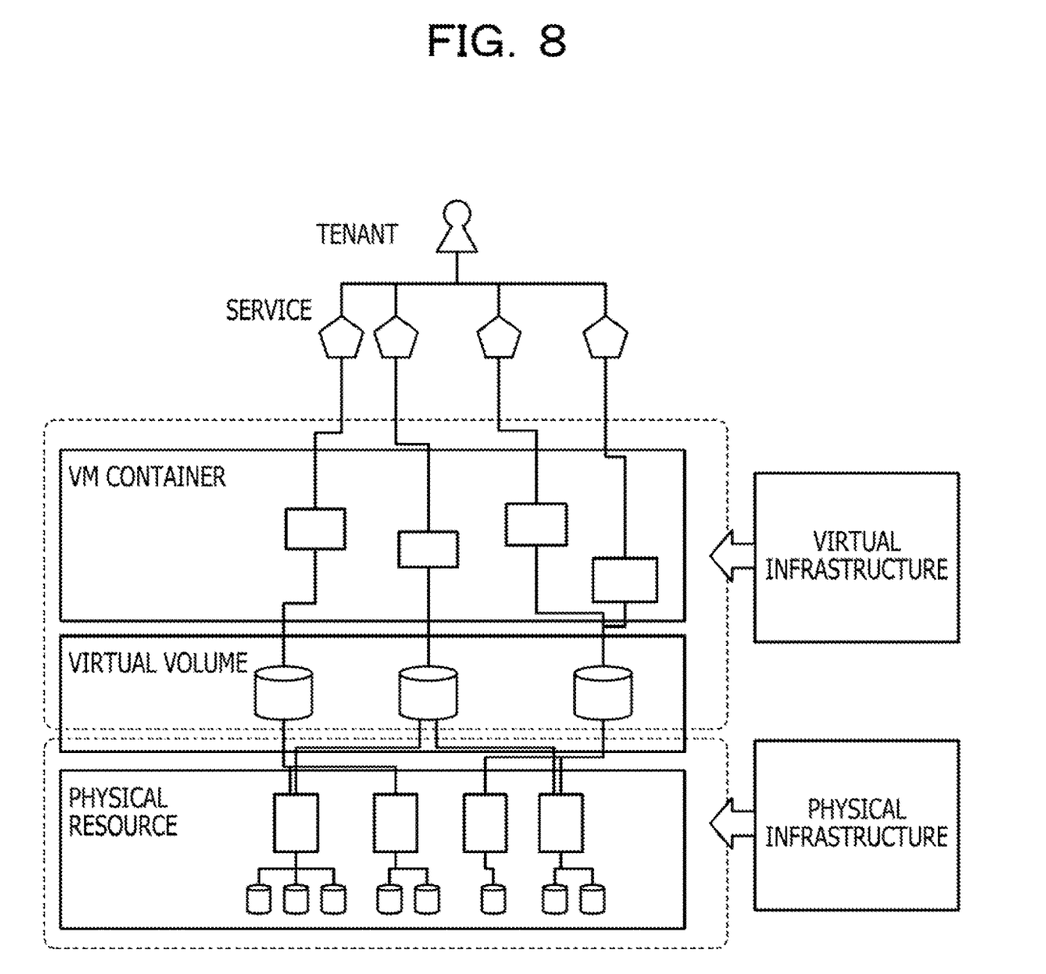
FIG. 8 is a diagram illustrating a display example of the configuration information.

FIG. 8 is a diagram illustrating, a display example of the configuration information. In FIG. 8, a pentagon represents the service, a laterally long rectangle represents the virtual machine or container, a vertically long rectangle represents the physical machine, a larger cylinder represents the virtual volume, and a smaller cylinder represents the physical volume. Lines indicate connection relationships. The virtual resources constitute a virtual infrastructure, and the physical resources constitute a physical infrastructure. The performance information is displayed, for example, around the node.

Note that, as a conventional technology for managing configuration information, there is a technology in which a management system holds a plurality of configuration information entries and a plurality of change information entries. Each of the plurality of configuration information entries is information representing a configuration change of a computer system. Each of the plurality of configuration information entries includes at least part of information included in information collected regularly from the computer system, and information specified on the basis of first and second information collected from the computer system in first and second collections, respectively. Each of the plurality of change information entries includes information manually input regarding the configuration change of the computer system, and is information representing the configuration change of the computer system. The management system performs management by associating at least one of the plurality of configuration information entries with at least one of the plurality of change information entries. Each of the plurality of configuration information entries is information based on the information collected regularly, for example, information obtained from information collected mechanically, and therefore has comprehensiveness that all differences between a configuration at a collection start time and a configuration at the next collection start time may be specified as configuration changes. On the other hand, each of the plurality of change information entries is information including manually input information, and therefore more detailed information regarding individual configuration changes may be obtained. At least one of the plurality of configuration information entries is associated with at least one of the plurality of change information entries. Therefore, a user (for example, an administrator) may know details about the configuration change represented by the mechanically obtained information.

Furthermore, as a conventional technology, there is a network monitoring device that may perform network monitoring and operation meeting user conditions even when configuration information held by a node is changed during operation, and may continue network monitoring even when switching to new configuration information is performed. This network monitoring device further performs automatic repair in a case where a node operating with invalid configuration information is detected in the network after performing the switching on the basis of the new configuration information.

International Publication Pamphlet No. WO 2017/154063 and Japanese Laid-open Patent Publication No. 9-289508 are disclosed as related art.

SUMMARY

According to an aspect of the embodiments, a performance information visualization apparatus includes: a memory configured to stores, as node information, information that indicates a connection relationship of a node, and information that indicates a generation in which the node is added to an information processing system and a generation in which the node is deleted from the information processing system; and a processor configured to that synthesizes configuration information by, when an event occurrence node where an event has occurred does not exist in configuration information of a specific generation associated with a time when the event has occurred and the event occurrence node is added to the configuration information, adding a node and connection between nodes including a connection relationship of the event occurrence node, based on the node information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the related art, when the performance information or event information is displayed in the configuration information illustrated in FIG. 8, there is a problem that it is not possible to display the performance information or the event information because a corresponding node is not included in the configuration information. Here, an event include, for example, a failure of a resource, concentration of access to the resource, or a standby time of the resource. The failure of the resource is detected by alive monitoring. Furthermore, the event may also be specified based on the performance information. For example, concentration of access to the virtual machine is specified when a usage rate of the virtual machine becomes a predetermined threshold or more.

Figure 9:
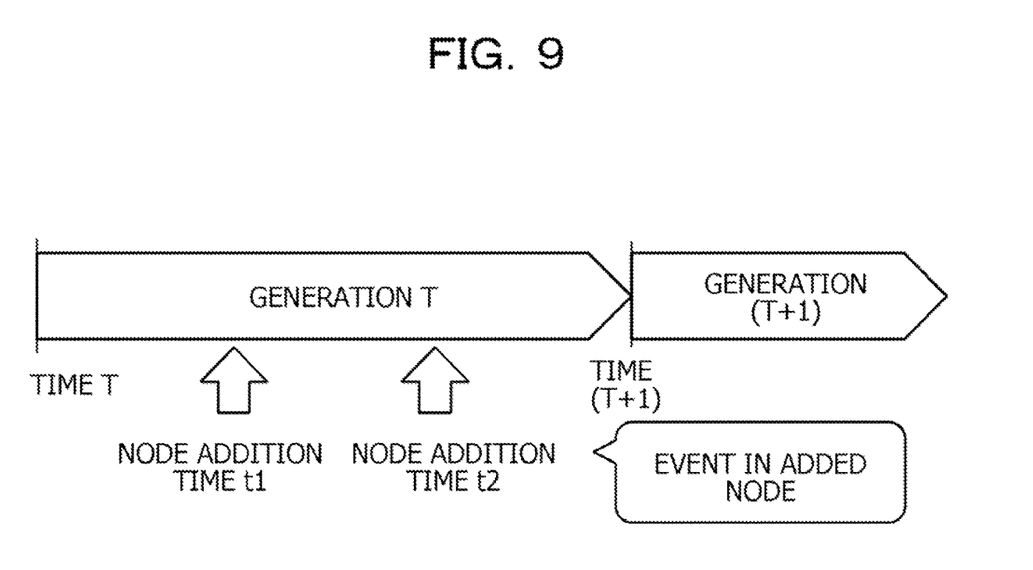
FIG. 9 is a diagram illustrating acquisition timings of the configuration information and performance information.

FIG. 9 is a diagram illustrating acquisition timings of the configuration information and the performance information. In FIG. 9, the configuration information is acquired at time T, time (T+1), and the like. Here, the configuration information acquired at the time T is referred to as configuration information of a generation T. The configuration information is acquired, for example, hourly or daily. Since performance changes more frequently than a configuration changes, an acquisition cycle of the performance information is short. Thus, as illustrated in FIG. 9, when a node is added at time t1 and an event occurs in the added node at time t2, the added node is not included in the configuration information of the generation T, and it is not possible to display the event. Here, T<t1<t2<(T+1) holds.

Figure 10:
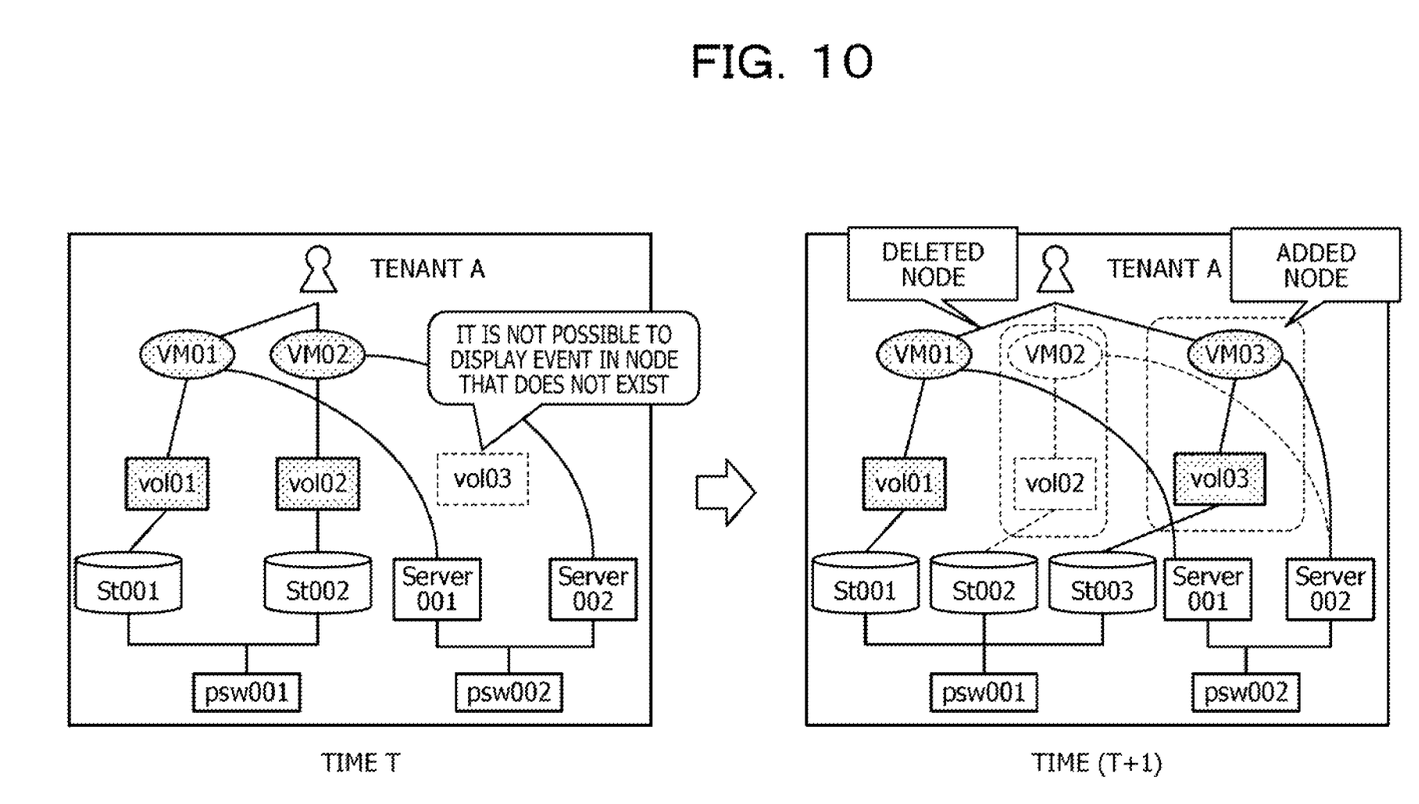
FIG. 10 is a diagram illustrating an example in which an event is not displayed in each of a case where configuration information of a generation T is used and a case where configuration information of a generation (T+1) is used.

On the other hand, when the configuration information of a generation (T+1) is used, it is possible to display the event in the added node, but it is not possible to display an event in a deleted node. FIG. 10 is a diagram illustrating an example in which an event is not displayed in each of the case where the configuration information of the generation T is used and the case where the configuration information of the generation (T+1) is used. In FIG. 10, between the time T and the time (T+1), a virtual volume "vol03" and a virtual machine "VM03" are added, and a virtual volume "vol02" and a virtual machine "VM02" are deleted. As illustrated in FIG. 10, when the configuration information at the time T is used, it is not possible to display an event in the virtual volume "vol03". On the other hand, in the case where the configuration information at the time (T+1) is used, it is not possible to display an event in the virtual volume "vol02".

Note that, although it is conceivable to search for a target node that is a target of an event from configuration information of a plurality of generations, in order to display a connection relationship between the target node and another node, the connection relationship of the nodes needs to be traced in the configuration information, and the search takes time.

In one aspect, the embodiment aims to display performance information or event information even in a case where a corresponding node is not included in configuration information.

Hereinafter, an embodiment of a performance information visualization apparatus, a performance information visualization method, and a performance information visualization program disclosed in the present application will be described in detail with reference to the drawings. Note that the embodiment does not limit the technology disclosed.

Embodiment

First, synthesis of configuration information by a performance information visualization apparatus according to an embodiment will be described. Here, the synthesis of configuration information is to create, in a case where a node that does not exist in configuration information of a certain generation is added, new configuration information by including not only the node to be added but also a connection relationship of the node to be added.

Figure 1:
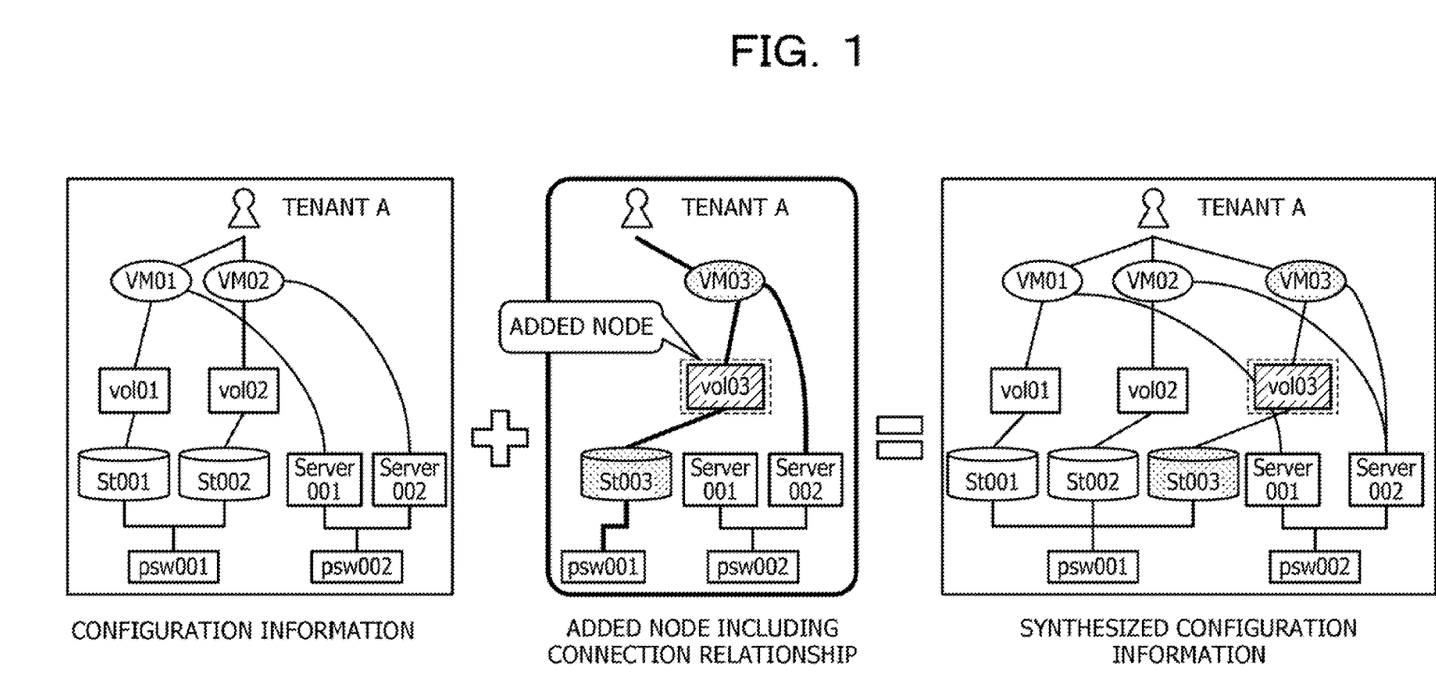
FIG. 1 is a diagram for describing synthesis of configuration information by a performance information visualization apparatus according to an embodiment.

FIG. 1 is a diagram for describing the synthesis of configuration information by the performance information visualization apparatus according to the embodiment. The configuration information in FIG. 1 indicates configuration information regarding nodes used by a tenant represented by "tenant A". The configuration information includes virtual machines (VMS) represented by "VM01" and "VM02", virtual volumes represented by "vol01" and "vol02", and physical storages represented by "St001" and "St002". Furthermore, the configuration information includes physical switches represented by "psw001" and "psw002", and physical machines represented by "Server001" and "Server002".

When a virtual volume "vol03" is added to this configuration information, the performance information visualization apparatus according to the embodiment also adds a virtual machine "VM03" and physical storage "St003", to which "vol03" is connected. Furthermore, the performance information visualization apparatus according to the embodiment adds connection between "VM03" and "vol03", connection between "tenant A" and "VM03", connection between "VM03" and "Server002", and connection between "vol03" and "St003". Furthermore, the performance information visualization apparatus according to the embodiment adds connection between "St003" and "psw001". The performance information visualization apparatus according to the embodiment synthesizes the configuration information by adding a node and connection until all connection destinations of an added node are included in the configuration information.

Figure 2:
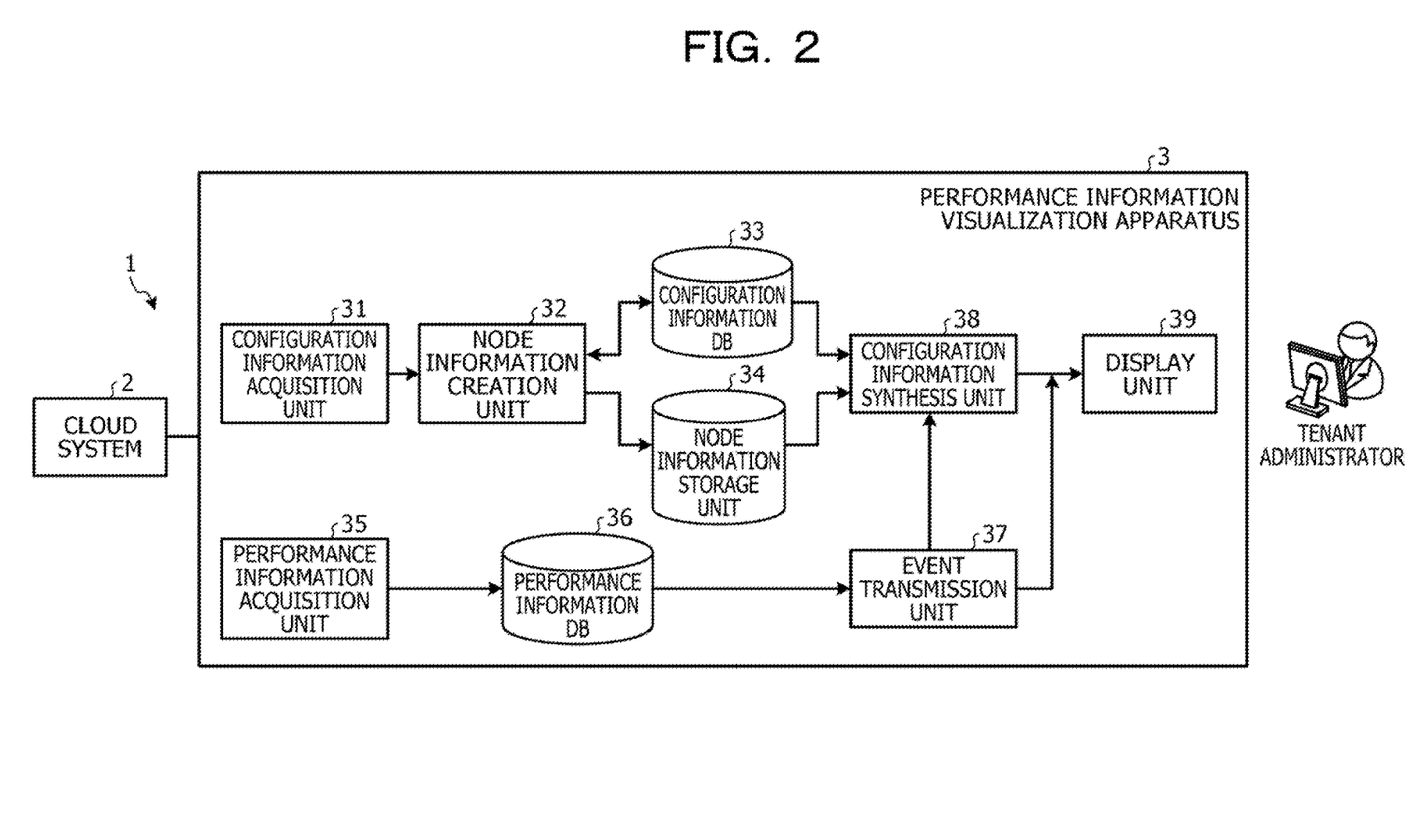
FIG. 2 is a diagram illustrating a configuration of a performance information visualization system according to the embodiment.

Next, a configuration of a performance information visualization system according to the embodiment will be described. FIG. 2 is a diagram illustrating the configuration of the performance information visualization system according to the embodiment. As illustrated in FIG. 2, a performance information visualization system 1 according to the embodiment includes a cloud system 2 and a performance information visualization apparatus 3.

The cloud system 2 is an information processing system that provides a service and a virtual resource to a tenant. The cloud system 2 includes a plurality of virtual resources and a plurality of physical resources.

The performance information visualization apparatus 3 displays, on a display device, configuration information of the cloud system 2 and performance information and event information of a node included in the cloud system 2. The performance information visualization apparatus 3 includes a configuration information acquisition unit 31, a node information creation unit 32, a configuration information database (DB) 33, a node information storage unit 34, a performance information acquisition unit 35, a performance information DB 36, an event transmission unit 37, a configuration information synthesis unit 38, and a display unit 39.

The configuration information acquisition unit 31 acquires the configuration information of the cloud system 2 from the cloud system 2. The configuration information acquisition unit 31 specifies a tenant and acquires configuration information related to the tenant from the cloud system 2.

The node information creation unit 32 stores configuration information acquired by the configuration information acquisition unit 31 in the configuration information DB 33. The configuration information DB 33 stores configuration information for each generation. The node information creation unit 32 compares configuration information of each generation with configuration information of a previous generation, and stores, in the node information storage unit 34, information regarding a node in a difference.

Figure 3:
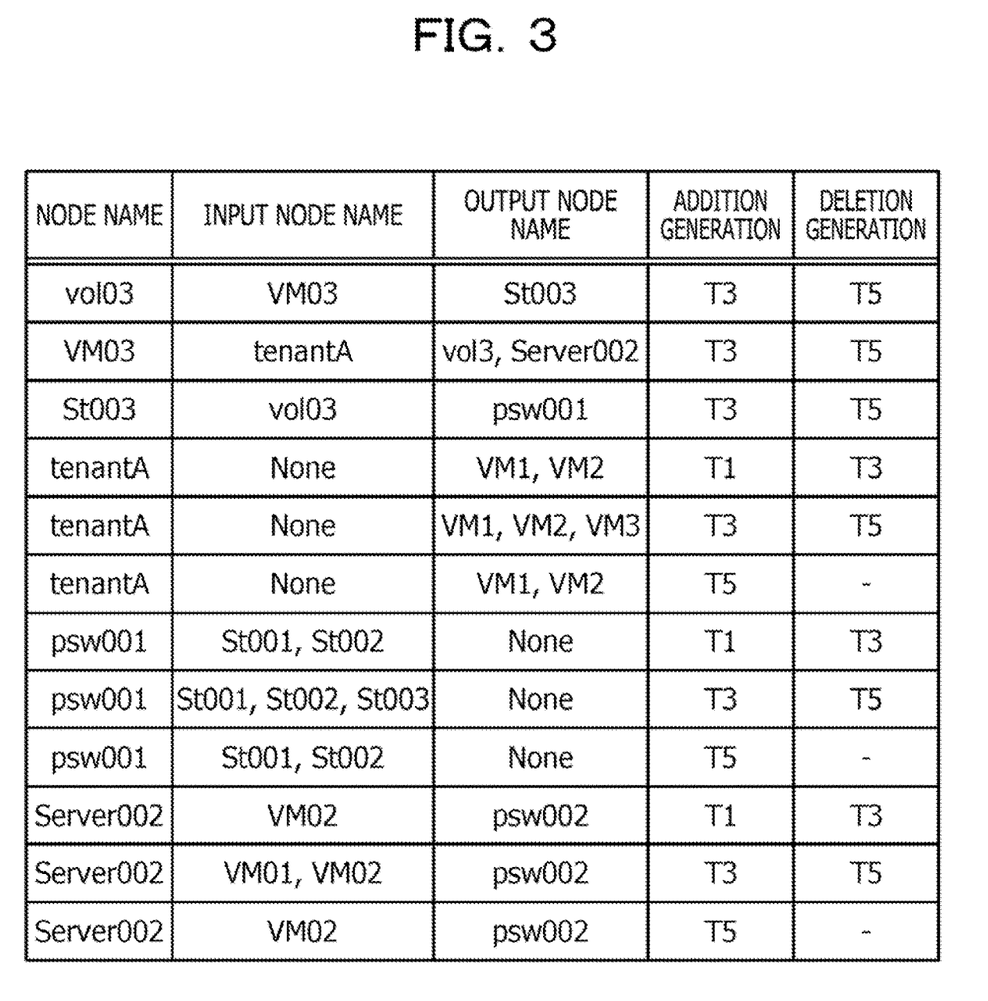
FIG. 3 is a diagram illustrating an example of a node information storage unit.

The node information storage unit 34 stores information regarding a connection relationship of a node and generations in which the node is added and deleted. FIG. 3 is a diagram illustrating an example of the node information storage unit 34. As illustrated in FIG. 3, the node information storage unit 34 stores a node name, an input node name, an output node name, an addition generation, and a deletion generation in association with each other.

The node name is a name that identifies a node. The input node name is a name of a node that uses the node, node that is deployed to the node, or the like. The output node name is a name of a node used by the node, node where the node is deployed, or the like. The addition generation is a generation in which the node was added. The deletion generation is a generation in which the node was deleted.

For example, "vol3" is used by "VM03", deployed to "St003", added in configuration information of a generation "T3", and deleted in configuration information of a generation "T5" Furthermore, "VM03" is used by "tenant A", uses "vol3", is deployed to "Server002", added in the configuration information of the generation "T3", and deleted in the configuration information of the generation "T5". Furthermore, "St003" deploys "vol3" and uses "psw001".

The performance information acquisition unit 35 acquires performance information of the cloud system 2 from the cloud system 2, and stores the acquired performance information in the performance information DB 36. The performance information acquisition unit 35 acquires the performance information at a frequency higher than a frequency at which the configuration information acquisition unit 31 acquires the configuration information. The performance information DB 36 stores performance information of the cloud system 2.

The event transmission unit 37 determines whether or not an event has occurred on the basis of performance information, and when the event has occurred, notifies the configuration information synthesis unit 38 and the display unit 39 of information regarding the event that has occurred. Furthermore, on the basis of alive monitoring, when a failure occurs in a node, the event transmission unit 37 notifies the configuration information synthesis unit 38 and the display unit 39 of the failure as an event. The event transmission unit 37 notifies the configuration information synthesis unit 38 and the display unit 39 of event information including an occurrence time of the event, a name of a node where the event has occurred, a type of the event, and performance information related to the event.

The configuration information synthesis unit 38 acquires configuration information of a generation corresponding to a time when an event has occurred from the configuration information DB 33. Furthermore, the configuration information synthesis unit 38 searches the node information storage unit 34 based on a node where the event has occurred (hereinafter referred to as "event occurrence node"), and acquires an addition generation and a deletion generation of the event occurrence node. Then, the configuration information synthesis unit 38 determines whether or not an event occurrence time is the addition generation or more and the deletion generation or less. For example, the configuration information synthesis unit 38 determines whether or not the acquired configuration information includes the event occurrence node. Then, when the event occurrence time is the addition generation or more and less than the deletion generation, the configuration information synthesis unit 38 passes the acquired configuration information to the display unit 39.

On the other hand, when the event occurrence time is not the addition generation or more or the deletion generation or less, the configuration information synthesis unit 38 performs synthesis of configuration information on the basis of the acquired configuration information and node information stored in the node information storage unit 34. For example, the configuration information synthesis unit 38 creates new configuration information including, in the acquired configuration information, the event occurrence node and a connection relationship of the event occurrence node.

For example, the configuration information synthesis unit 38 searches the node information storage unit 34 based on each of nodes connected to the event occurrence node (hereinafter referred to as "connection nodes"), and acquires an addition generation and a deletion generation of each connection node. Then, the configuration information synthesis unit 38 determines, for each connection node, whether or not the event occurrence time is greater than the addition generation and smaller than the deletion generation. For example, the configuration information synthesis unit 38 determines whether or not the acquired configuration information includes each connection node. Then, when the event occurrence time is greater than the addition generation and smaller than the deletion generation for all the connection nodes, the configuration information synthesis unit 38 completes the synthesis of the configuration information by adding the event occurrence node and connection of the event occurrence node.

On the other hand, for a connection node in which the event occurrence time is not greater than the addition generation or smaller than the deletion generation, the configuration information synthesis unit 38 repeats search processing of searching for a new connection node by replacing the connection node with the event occurrence node. The configuration information synthesis unit 38 repeats the search processing until the new connection node is included in the acquired configuration information.

When the configuration information synthesis unit 38 completes the synthesis of the configuration information, the configuration information synthesis unit 38 passes the synthesized configuration information to the display unit 39.

The display unit 39 displays configuration information acquired from the configuration information synthesis unit 38 on the display device together with event information notified from the event transmission unit 37. A tenant administrator conducts a fault investigation or the like on the basis of configuration information and event information that are displayed on the display device.

Figure 4:
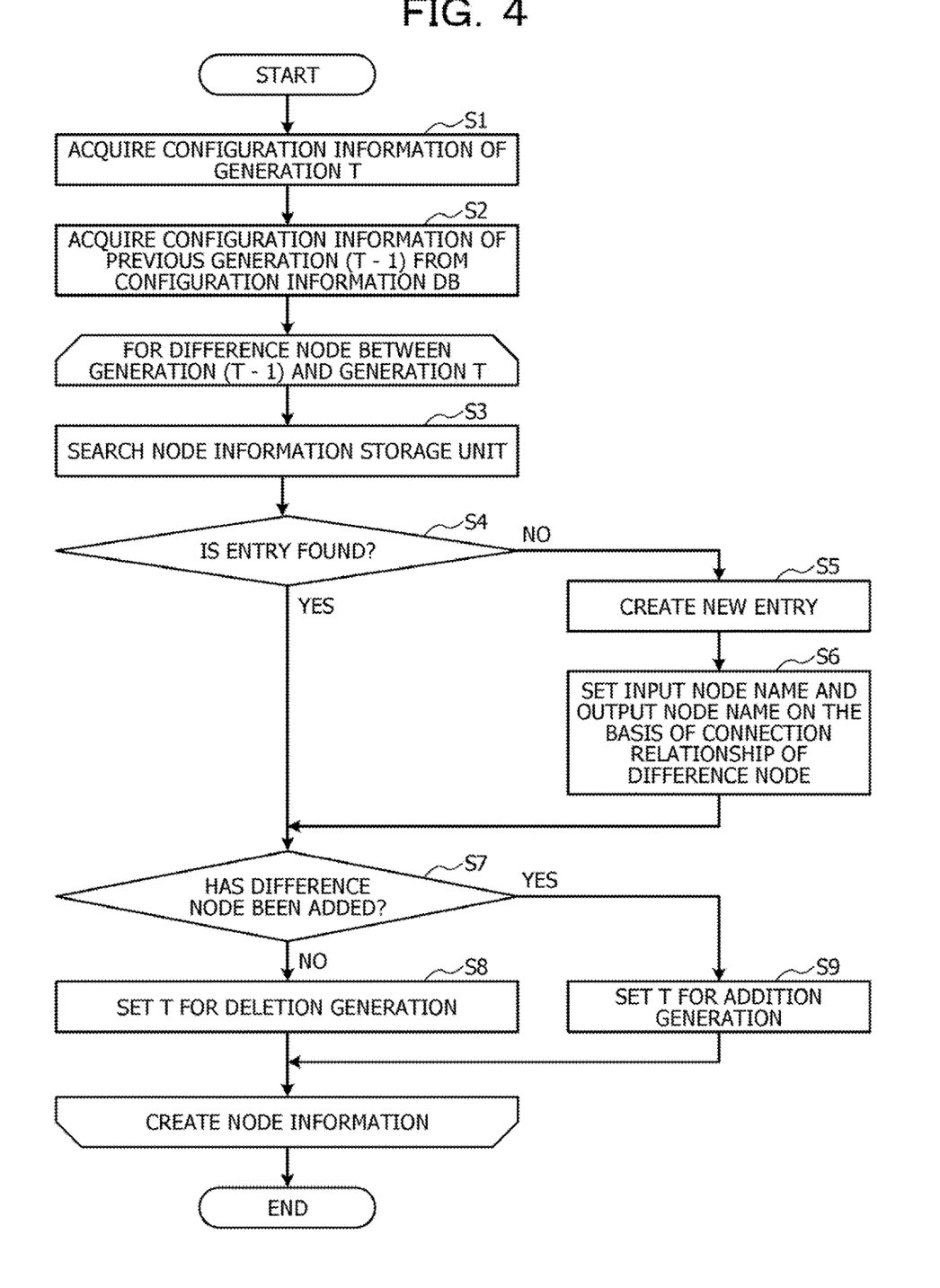
FIG. 4 is a flowchart illustrating a flow of node information creation processing by a node information creation unit.

Next, a flow of processing by the performance information visualization apparatus 3 will be described with reference to FIGS. 4 to 6. FIG. 4 is a flowchart illustrating a flow of node information creation processing by the node information creation unit 32. Note that the processing illustrated in FIG. 4 is performed at a timing when configuration information of a generation T is acquired.

As illustrated in FIG. 4, the node information creation unit 32 acquires the configuration information of the generation T (Step S1), and acquires configuration information of a previous generation (T−1) from the configuration information DB 33 (Step S2), Then, the node information creation unit 32 creates and updates node information by executing the following processing of Steps S3 to S9 for each of difference nodes between the generation (T−1) and the generation T.

For example, the node information creation unit 32 searches the node information storage unit 34 for the difference node (Step S3), and determines whether or not an entry of the difference node is found (Step S4). Then, when the entry of the difference node is not found, the node information creation unit 32 creates a new entry in the node information storage unit 34 (Step S5), and sets an input node name and an output node name on the basis of a connection relationship of the difference node (Step S6).

Then, the node information creation unit 32 determines whether or not the difference node has been added (Step S7), and in a case where the difference node has not been added, sets T for a deletion generation (Step S8), and in a case where the difference node has been added, sets T for an addition generation (Step S9).

In this way, since the node information creation unit 32 creates the node information, the configuration information synthesis unit 38 may perform synthesis of the configuration information by using the node information.

Figure 5:
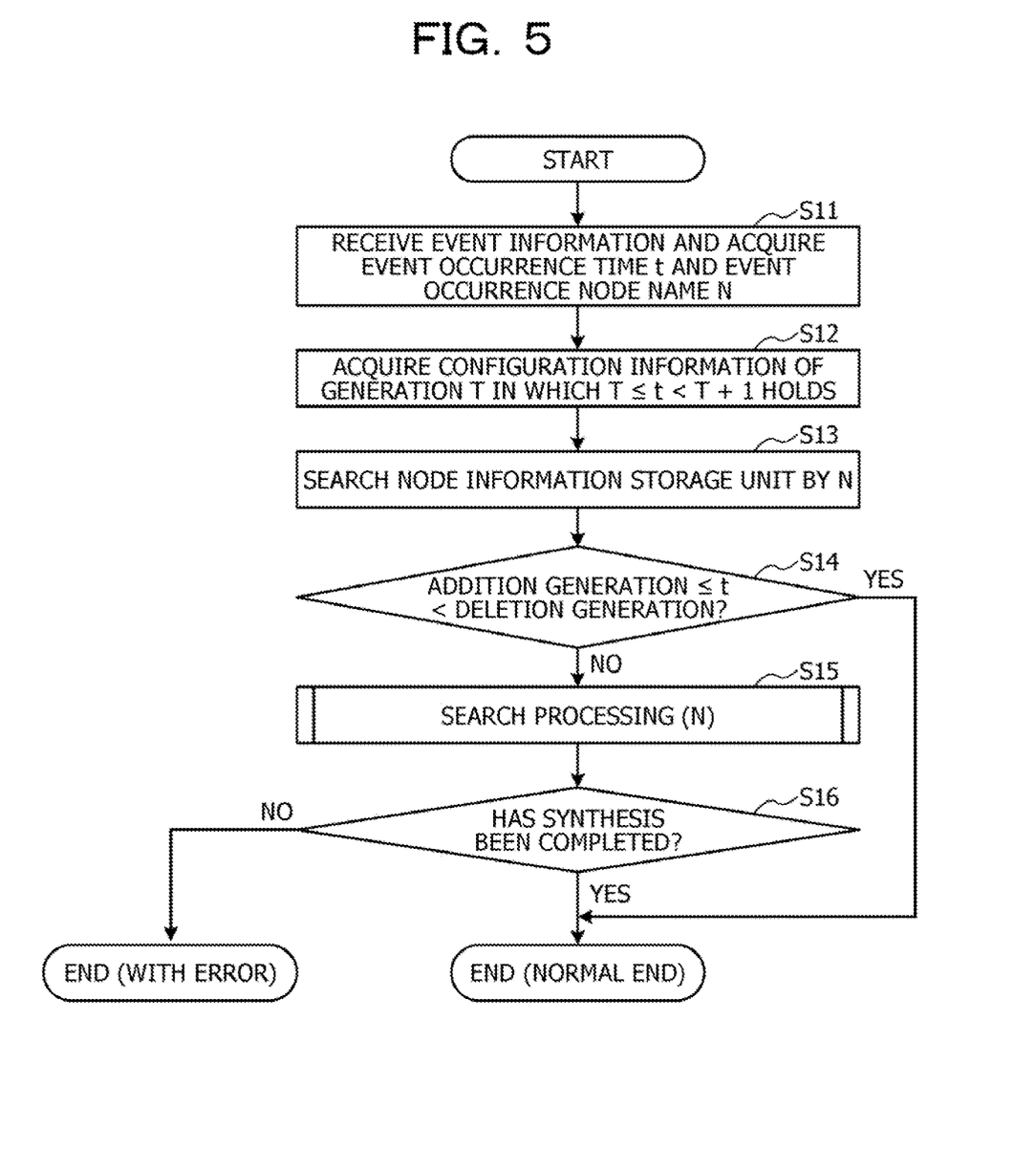
FIG. 5 is a flowchart illustrating a flow of configuration information synthesis processing by a configuration information synthesis unit.

FIG. 5 is a flowchart illustrating a flow of configuration information synthesis processing by the configuration information synthesis unit 38. As illustrated in FIG. 5, the configuration information synthesis unit 38 receives event information and acquires event occurrence time t and an event occurrence node name N (Step S11). Then, the configuration information synthesis unit 38 acquires configuration information of a generation T in which t is T or more and less than (T+1) from the configuration information DB 33 (Step S12), and searches the node information storage unit 34 by N (Step S13).

Then, the configuration information synthesis unit 38 determines whether or not t is an addition generation of N or more and t is less than a deletion generation of N (Step S14), and in a case where t is the addition generation of N or more and t is less than the deletion generation of N, ends the configuration information synthesis processing normally. On the other hand, when t is not the addition generation of N or more or t is not less than the deletion generation of N, the configuration information synthesis unit 38 performs search processing (Step S15). In the search processing, the configuration information synthesis unit 38 searches for a node while replacing N with a connection destination until all connection destinations of N are included in the configuration information, and responds whether or not the synthesis of the configuration information is completed.

Then, the configuration information synthesis unit 38 determines whether or not the response regarding the completion of the synthesis of the configuration information has been made in the search processing (Step S16), and when the response regarding the completion of the synthesis has been made, ends the configuration information synthesis processing normally, and when the response regarding the completion of the synthesis has not been made, ends the configuration information synthesis processing with an error.

In this way, the configuration information synthesis unit 38 may add the node in which an event has occurred to the configuration information by including a connection relationship as well by performing synthesis of the configuration information.

Figure 6:
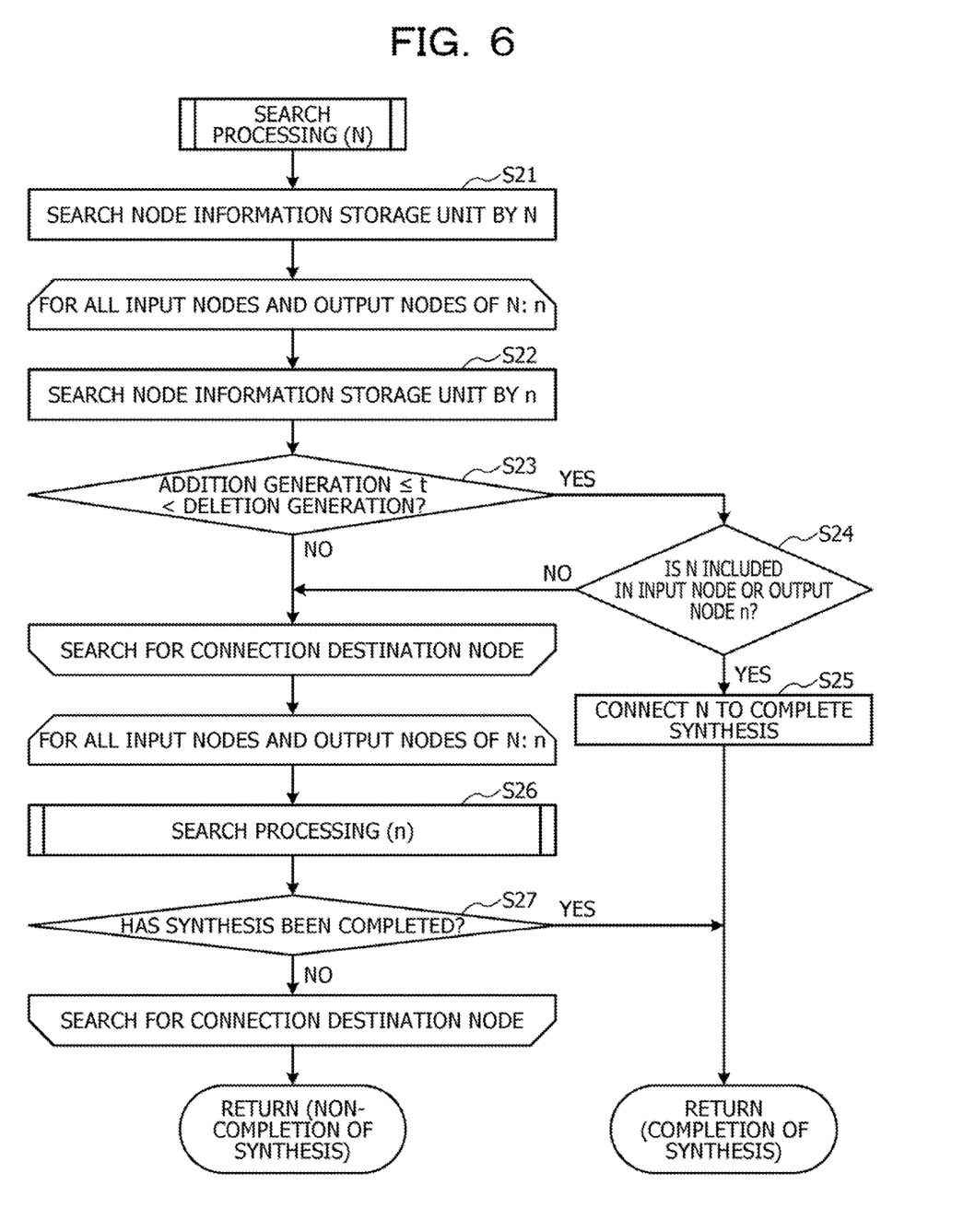
FIG. 6 is a flowchart illustrating a flow of search processing by the configuration information synthesis unit.

FIG. 6 is a flowchart illustrating a flow of the search processing by the configuration information synthesis unit 38. As illustrated in FIG. 6, the configuration information synthesis unit 38 searches the node information storage unit 34 by N (Step S21), and performs the following processing of Steps S22 to S24 for all input nodes and output nodes of N. Note that, here, an input node or output node of N is defined as n.

The configuration information synthesis unit 38 searches the node information storage unit 34 by n (Step S22), and determines whether or not t is an addition generation of n or more and t is less than a deletion generation of n (Step S23). Then, when t is the addition generation of n or more and t is less than the deletion generation of n, the configuration information synthesis unit 38 determines whether or not N is included in an input node or output node n (Step S24), Then, when N is included in the input node or output node n, the configuration information synthesis unit 38 connects N to configuration information to complete synthesis (Step S25), and makes a response regarding the completion of the synthesis.

On the other hand, when N is not included in the input node or output node n, the configuration information synthesis unit 38 processes the next n. Furthermore, when t is not the addition generation of n or more or t is not less than the deletion generation of n, the configuration information synthesis unit 38 processes the next n.

Then, when the processing of Steps S22 to S24 ends for all the input nodes and output nodes of N, the configuration information synthesis unit 38 performs the following processing of Steps S26 and S27. For example, the configuration information synthesis unit 38 executes search processing by specifying n (Step S26), and determines whether or not the synthesis has been completed (Step S27). Then, when the synthesis has been completed, the configuration information synthesis unit 38 makes a response regarding the completion of the synthesis. On the other hand, when the synthesis has not been completed, the configuration information synthesis unit 38 processes the next n. Then, when the processing of Steps S26 and S27 ends for all the input nodes and output nodes of N, the configuration information synthesis unit 38 makes a response regarding non-completion of the synthesis.

In this way, since the configuration information synthesis unit 38 searches a synthesis range by using the node information storage unit 34, the configuration information synthesis unit 38 may perform synthesis of the configuration information.

As described above, in the embodiment, the node information storage unit 34 stores information regarding a connection relationship of a node and generations in which the node is added and deleted. Then, the configuration information synthesis unit 38 acquires configuration information of a generation corresponding to a time when an event has occurred from the configuration information DB 33, and determines whether or not the acquired configuration information includes an event occurrence node on the basis of event information and the node information storage unit 34. Then, when the acquired configuration information does not include the event occurrence node, the configuration information synthesis unit 38 creates new configuration information including, in the acquired configuration information, not only the event occurrence node but also a connection relationship of the event occurrence node, on the basis of the node information storage unit 34. Thus, the performance information visualization apparatus 3 may display performance information or event information even in a case where a corresponding node is not included in the configuration information.

Furthermore, in the embodiment, the node information creation unit 32 stores, in the node information storage unit 34, information regarding a connection relationship of a node and generations in which the node is added and deleted. Thus, the configuration information synthesis unit 38 may synthesize the configuration information based on the node information storage unit 34.

Furthermore, in the embodiment, the configuration information synthesis unit 38 synthesizes configuration information by adding a node and connection between nodes until all connection destinations of a node added to the configuration information are included in the configuration information. Thus, the display unit 39 may display a relationship between an event occurrence node and another node.

Furthermore, in the embodiment, the configuration information synthesis unit 38 determines whether or not the configuration information includes each connection node. Then, for a connection node that is not included in the configuration information, the configuration information synthesis unit 38 repeats processing of searching for a new connection node by replacing the connection node with the event occurrence node until the new connection node is included in the configuration information. Thus, the configuration information synthesis unit 38 may add a node and connection between nodes until all connection destinations of a node added to the configuration information are included in the configuration information.

Furthermore, in the embodiment, configuration information of each generation is compared with configuration information of a previous generation, and information regarding a node in a difference is stored in the node information storage unit 34. Thus, the configuration information synthesis unit 38 may synthesize the configuration information based on the node information storage unit 34.

Note that, in the embodiment, the performance information visualization apparatus 3 has been described. However, by implementing the configurations included in the performance information visualization apparatus 3 by software, a performance information visualization program that has a similar function may be obtained. Thus, a computer that executes the performance information visualization program will be described.

Figure 7:
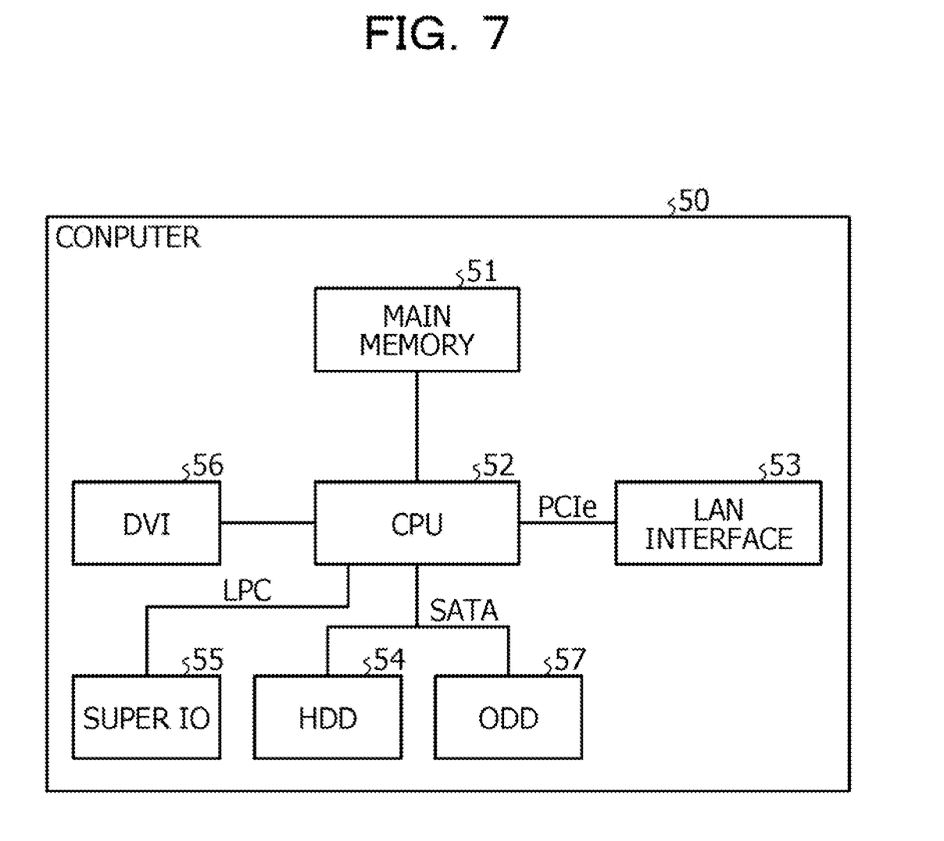
FIG. 7 is a diagram illustrating a hardware configuration of a computer that executes a performance information visualization program according to the embodiment.

FIG. 7 is a diagram illustrating a hardware configuration of the computer that executes the performance information visualization program according to the embodiment. As illustrated in FIG. 7, a computer 50 includes a main memory 51, a central processing unit (CPU) 52, a local area network (LAN) interface 53, and a hard disk drive (HDD) 54. Furthermore, the computer 50 includes a super input output (IO) 55, a digital visual interface (DVI) 56, and an optical disk drive (ODD) 57.

The main memory 51 is a memory that stores a program, a halfway result of execution of the program, and the like. The CPU 52 is a central processing unit that reads and executes a program from the main memory 51. The CPU 52 includes a chipset having a memory controller.

The LAN interface 53 is an interface for connecting the computer 50 to another computer via a LAN. The HDD 54 is a disk device that stores a program and data, and the super IO 55 is an interface for connecting an input device such as a mouse and a keyboard. The DVI 56 is an interface that connects a liquid crystal display device, and the ODD 57 is a device that reads and writes data from and to a digital versatile disc (DVD).

The LAN interface 53 is connected to the CPU 52 by peripheral component interconnect express (PCIe), and the HDD 54 and the ODD 57 are connected to the CPU 52 by serial advanced technology attachment (SATA). The super IO 55 is connected to the CPU 52 by low pin count (LPC).

Then, the performance information visualization program executed by the computer 50 is stored in a DVD that is an example of a recording medium that may be read by the computer 50, and is read from the DVD by the ODD 57 to be installed to the computer 50. Alternatively, the performance information visualization program is stored in databases or the like of another computer system connected via the LAN interface 53, and is read from these databases to be installed to the computer 50. Then, the installed performance information visualization program is stored in the HDD 54, read to the main memory 51, and executed by the CPU 52.

Furthermore, in the embodiment, the case of displaying the configuration information of the cloud system 2 has been described. However, the performance information visualization apparatus 3 may display configuration information of another information processing system.

Ail examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention,

What is claimed is:

1. A performance information visualization apparatus comprising:
   a memory configured to store, as node information, information that indicates a connection relationship of a node, and information that indicates a generation in which the node is added to an information processing system and a generation in which the node is deleted from the information processing system; and
   a processor configured to synthesize configuration information by, when an event occurrence node where an event has occurred does not exist in configuration information of a specific generation associated with a time when the event has occurred and the event occurrence node is added to the configuration information, adding a node and connection between nodes including a connection relationship of the event occurrence node, based on the node information,
   the processor acquires configuration information of the information processing system, creates the node information, and stores the node information in the memory,
   the processor performs, for all two adjacent generations, processing of extracting a node included in a difference between two adjacent generations and storing the node in the memory.

2. The performance information visualization apparatus according to claim 1, wherein the processor synthesizes the configuration information by adding the node and the connection until all connection destinations of an added nodes are included in the configuration information.

3. The performance information visualization apparatus according to claim 2, wherein the processor is further configured to: determine, based on the connection relationship, whether or not each connection node connected to the event occurrence node is included in the configuration information of the specific generation, and repeat, for a connection node that is not included in the configuration information of the specific generation, processing of searching for a new connection node by replacing the connection node with the event occurrence node until the new connection node is included in the configuration information of the specific generation.

4. A performance information visualization method comprising:
   storing, as node information, information that indicates a connection relationship of a node, and information that indicates a generation in which the node is added to an information processing system and a generation in which the node is deleted from the information processing system;
   synthesizing configuration information by, when an event occurrence node where an event has occurred does not exist in configuration information of a specific generation associated with a time when the event has occurred and the event occurrence node is added to the configuration information, adding a node and connection between nodes including a connection relationship of the event occurrence node, based on the node information;
   acquiring configuration information of the information processing system, creates the node information, and stores the node information in the memory; and
   performing, for all two adjacent generations, processing of extracting a node included in a difference between two adjacent generations and storing the node in the memory.

5. A non-transitory computer-readable storage medium storing a program that causes a processor included in a performance information visualization apparatus to execute a process, the process comprising:
   storing, as node information, information that indicates a connection relationship of a node, and information that indicates a generation in which the node is added to an information processing system and a generation in which the node is deleted from the information processing system;
   synthesizing configuration information by, when an event occurrence node where an event has occurred does not exist in configuration information of a specific generation associated with a time when the event has occurred and the event occurrence node is added to the configuration information, adding a node and connection between nodes including a connection relationship of the event occurrence node, based on the node information;
   acquiring configuration information of the information processing system, creates the node information, and stores the node information in the memory; and
   performing, for all two adjacent generations, processing of extracting a node included in a difference between two adjacent generations and storing the node in the memory.

* * * * *